July 7, 1931.  W. I. JONES  1,813,892

RIVET

Filed March 16, 1929

Inventor:
Walter I. Jones
By Emery, Booth, Varney & Townsend
Attys

Patented July 7, 1931

1,813,892

UNITED STATES PATENT OFFICE

WALTER I. JONES, OF ARLINGTON, MASSACHUSETTS, ASSIGNOR TO UNITED-CARR FASTENER CORPORATION, OF CAMBRIDGE, MASSACHUSETTS, A CORPORATION OF MASSACHUSETTS

RIVET

Application filed March 16, 1929. Serial No. 347,637.

My invention aims to provide improvements in rivets.

In the drawings, which illustrate a preferred embodiment of my invention:—

Figure 4:
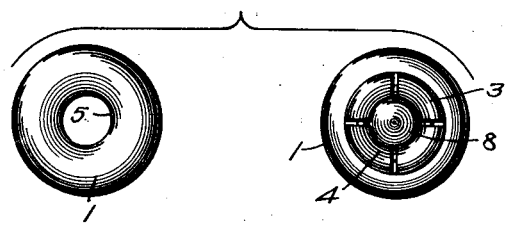

Fig. 4 includes views of each end of the rivet.

Referring to my invention, as illustrated by the drawings, I have shown a simple one-piece rivet particularly adapted for securing two or more parts together. The rivet illustrated is particularly useful when it is difficult or impossible to obtain access to one side of the parts and, therefore, making it necessary to apply and upset the rivet while being able to work at only one side of the parts to be secured together.

The illustrated embodiment of my invention is formed from sheet metal and has a hollow collapsible head 1 and a shank 2 of smaller diameter than the head 1. The shank 2 is divided by a number of longitudinal slits to provide a series of yieldable fingers 3 provided with inturned portions 4 at their free ends surrounding an aperture at the free end of the shank 2.

Figure 1:
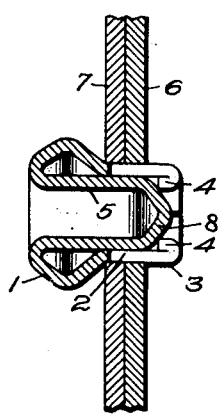
Figure 1 is a section showing two plates in cross-section as they appear prior to setting the rivet to secure the two plates together.

Within the rivet, I have provided an axially movable expanding element 5 which is pressed from the material of the head and has a tapered end contacting with the inturned portions 4, as best illustrated in Fig. 1.

Figure 2:
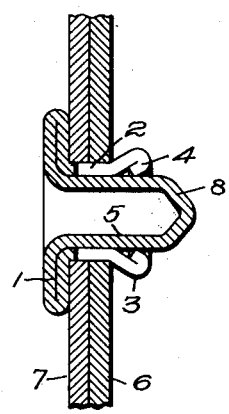
Fig. 2 is a section similar to Fig. 1, but showing the rivet as it appears after being set.
Figure 3:
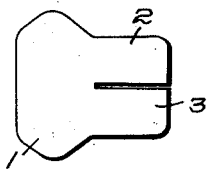
Fig. 3 is a side elevation of the rivet.

In Figs. 1 and 2, I have shown a rivet, formed as above described, used to secure two thin sheets 6, 7 of metal together. In securing the metal sheets 6 and 7 together, the shank of a rivet is first pushed through holes formed in the sheets, as shown in Fig. 1. To secure the rivet in place a suitable tool (not shown) is used to exert a crushing force against the head 1, which, because of its shape, will readily collapse to the shape shown in Fig. 2. When the head 1 collapses, the expanding element 5 moves axially relative to the shank and the tapered end portion 8 thereof wedges against the ends 4 of the fingers 3 to expand that portion of the shank which extends through the plate 7, as clearly illustrated in Fig. 2.

While I have illustrated and described a preferrred embodiment of my invention, I do not wish to be limited thereby as the scope of my invention is best defined in the following claims.

Claims:

1. A one-piece tubular rivet having a shank, a head integral with one end of said shank, axially movable means integral with said head and located within the rivet and means formed as a part of said shank thereby to provide for expansion of a portion of the shank when the axially movable means is moved relative to the shank.

2. A one-piece tubular rivet having a slit shank, a hollow collapsible head integral with one end of said shank, inwardly bent means integral with the other end of said shank and tubular-shaped shank-expanding means formed integral with said head and located between the head and inwardly bent means whereby when said head is collapsed one end of said shank-expanding means is forced against said inwardly bent means to expand said shank.

3. A one-piece rivet formed of sheet metal and having a hollow collapsible head, a number of expansible fingers extending from said head and having free ends, said fingers being arranged to provide a tubular shank, an inturned portion at the free end of each finger and an axially movable expanding element located between said head and the inturned portions of said fingers, said expanding element being pressed from said head and having a free end located adjacent to the inturned portions and said expanding elements being adapted to be moved with said head so that the said free end strikes against said inturned portions to expand the free end of each finger when said head is collapsed.

4. A one-piece tubular rivet formed of sheet metal and having a hollow collapsible head, a shank of smaller diameter than said head extending from the under side thereof, an axially movable expanding element formed integral with said head and located within said rivet, said axially movable means being adapted to be moved by collapsing said head and means integral with the shank for engagement by said axially movable expanding element thereby to expand said shank when said head is collapsed.

5. A one-piece rivet formed of sheet metal and having a hollow collapsible head 1, a shank 2 of smaller diameter than said head 1 and extending from the under side thereof, an axially movable expanding element 5 assembled within said rivet and formed integral with the head 1, said element 5 having a tapered end and being adapted to be moved by collapsing said head 1 and means 4 integral with the shank at its free end for engagement by the tapered end portion 8 of said axially movable expanding element 5 to expand said shank portion 2 adjacent to its free end.

In testimony whereof, I have signed my name to this specification.

WALTER I. JONES.